United States Patent
Choi et al.

(10) Patent No.: US 7,573,013 B2
(45) Date of Patent: Aug. 11, 2009

(54) PIXEL DRIVING CIRCUIT AND METHOD OF DRIVING THE SAME HAVING SHARED CONTACTS WITH NEIGHBORING PIXEL CIRCUITS

(75) Inventors: Sung-Ho Choi, Seoul (KR); Yi-Tae Kim, Suwon-Si (KR); Young-Chan Kim, Seongnam-Si (KR); Hae-Kyung Kong, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 11/435,961

(22) Filed: May 17, 2006

(65) Prior Publication Data

US 2007/0029465 A1    Feb. 8, 2007

(30) Foreign Application Priority Data

Jun. 8, 2005    (KR) .................... 10-2005-0048823

(51) Int. Cl.
*H01L 27/00*    (2006.01)
*H04N 3/14*    (2006.01)

(52) U.S. Cl. .................................. 250/208.1; 348/308

(58) Field of Classification Search ............... 250/208.1; 348/302, 308; 257/292
See application file for complete search history.

(56) References Cited

U.S. PATENT DOCUMENTS

| | | | | |
|---|---|---|---|---|
| 6,160,281 A | * | 12/2000 | Guidash | 257/292 |
| 6,423,994 B1 | | 7/2002 | Guidash | 257/292 |
| 2004/0173864 A1 | * | 9/2004 | Inagaki et al. | 257/443 |
| 2005/0128327 A1 | * | 6/2005 | Bencuya et al. | 348/308 |

OTHER PUBLICATIONS

Korean Patent Application No. 1020040005362 to Makoto et al, having Publication date of Sep. 18, 2004 (w/ English Abstract page).
Korean Patent Application No. 1020047014770 to Mitsuyoshi et al, having Publication date of Jan. 3, 2005 (w/ English Abstract page).

* cited by examiner

*Primary Examiner*—Thanh X Luu
(74) *Attorney, Agent, or Firm*—Monica H. Choi (57) ABSTRACT

Contacts and/or a transistor are shared by neighboring pixel circuits in an image sensor. In addition, a common interconnect line provides common control signals for minimizing metal wiring. Such minimization of space for the shared contacts, transistor, and control signals enhances the fill factor of photodiodes in the image sensor.

18 Claims, 8 Drawing Sheets

PIXEL DRIVING CIRCUIT AND METHOD OF DRIVING THE SAME HAVING SHARED CONTACTS WITH NEIGHBORING PIXEL CIRCUITS

BACKGROUND OF THE INVENTION

This application claims priority to Korean Patent Application No. 2005-48823, filed on Jun. 8, 2005 in the Korean Intellectual Property Office, the disclosure of which is incorporated herein in its entirety by reference.

1. Field of the Invention

The present invention relates generally to image sensors, and more particularly, to pixel circuits of a complementary metal oxide semiconductor (CMOS) image sensor having shared components.

2. Description of the Related Art

Complementary metal oxide semiconductor (CMOS) image sensors are included in common electronic devices such as mobile phones and digital still cameras for example. CMOS image sensors convert images into electrical signals, convert the electrical signals into digital image signals, and output the digital image signals. Such digital image signals are commonly output as three-color (red, green, and blue) image data signals. After being processed, the digital image signals drive display devices such as liquid crystal displays (LCDs).

Figure 1:
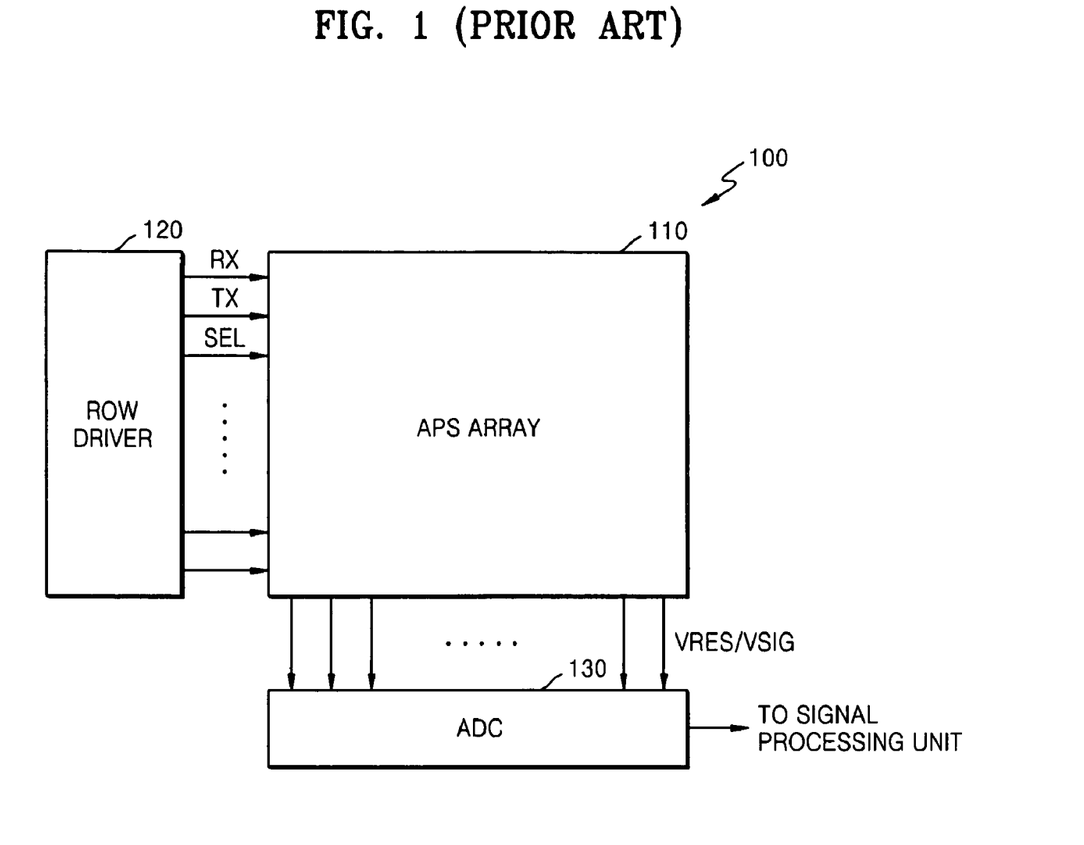
FIG. 1 is a block diagram of a conventional complementary metal oxide semiconductor (CMOS) image sensor.

FIG. 1 is a block diagram of a conventional CMOS image sensor 100. Referring to FIG. 1, the image sensor 100 includes an active pixel sensor (APS) array 110, a row driver 120, and an analog-to-digital converter (ADC) 130.

The row driver 120 receives a control signal from a row decoder (not shown), and the ADC 130 receives a control signal from a column decoder (not shown). The image sensor 100 also includes a controller (not shown) that generates timing control signals as well as addressing signals for outputting a selected image signal as detected by each pixel.

Figure 2:
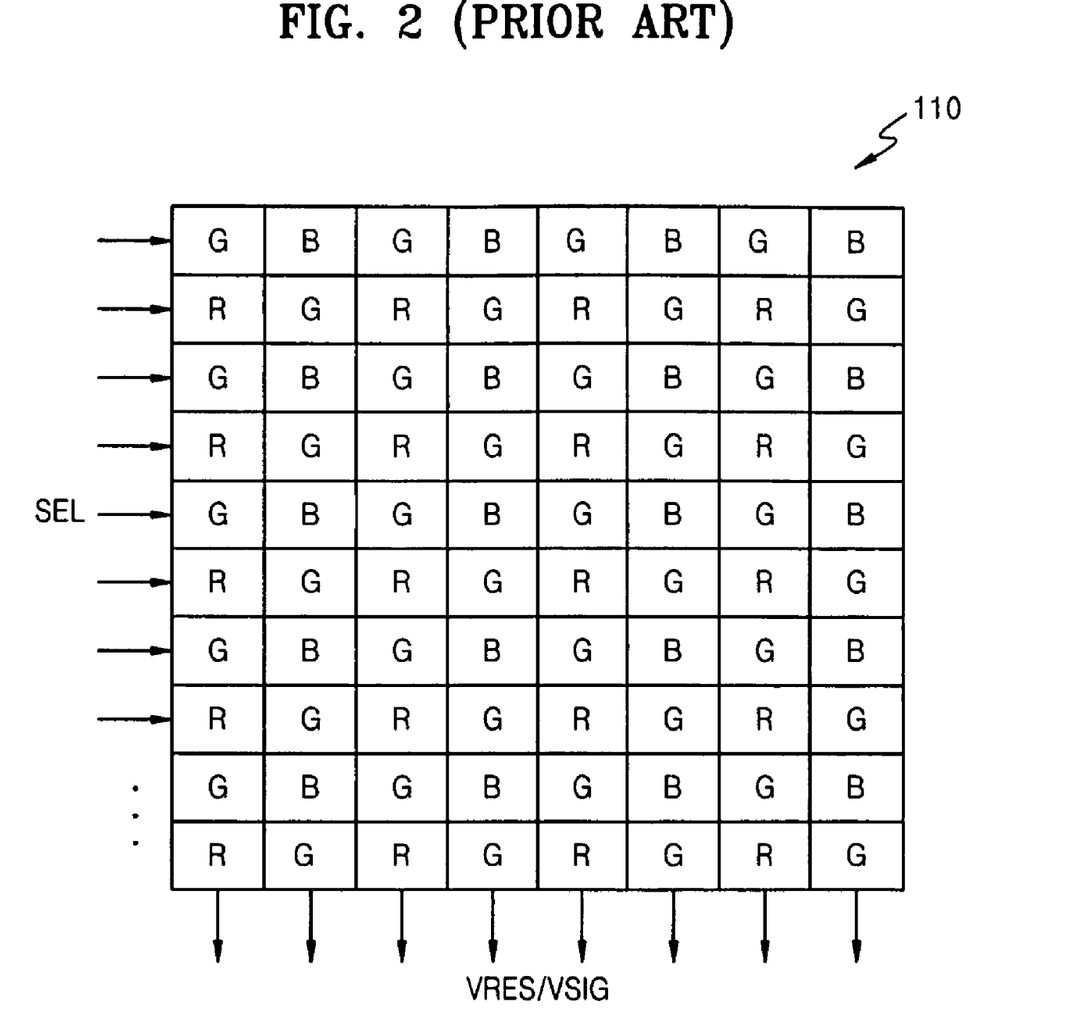
FIG. 2 illustrates an example color filter pattern of an active pixel sensor (APS) array of FIG. 1, according to the prior art.

FIG. 2 illustrates an example of a color filter pattern of the APS array 110 of FIG. 1. Referring to FIG. 2, the CMOS image sensor 100, if it is a color image sensor, includes a color filter in an upper part of each pixel to process light of a certain color. The CMOS image sensor 100 includes at least three types of color filters to generate color signals. The most common color filter pattern is a Bayer pattern in which patterns of red and green and patterns of green and blue are repeated in alternate rows. In this case, green, which is closely related to a luminance signal, is placed in all rows, and red and blue are placed in alternate rows to enhance luminance resolution. CMOS image sensors including more than one million pixels are implemented in, for example, digital still cameras, to enhance resolution.

The APS array 110 included in the CMOS image sensor 100 having this pixel structure includes photodiodes. Each photodiode detects light for converting the detected light into an electrical signal which is the image signal. The analog image signal output from the APS array 110 is for one of the three-colors (red, green, and blue). The ADC 130 receives and then converts the analog image signal output from the APS array 110 into a digital signal using a well-known correlated double sampling (CDS) method.

Figure 3:
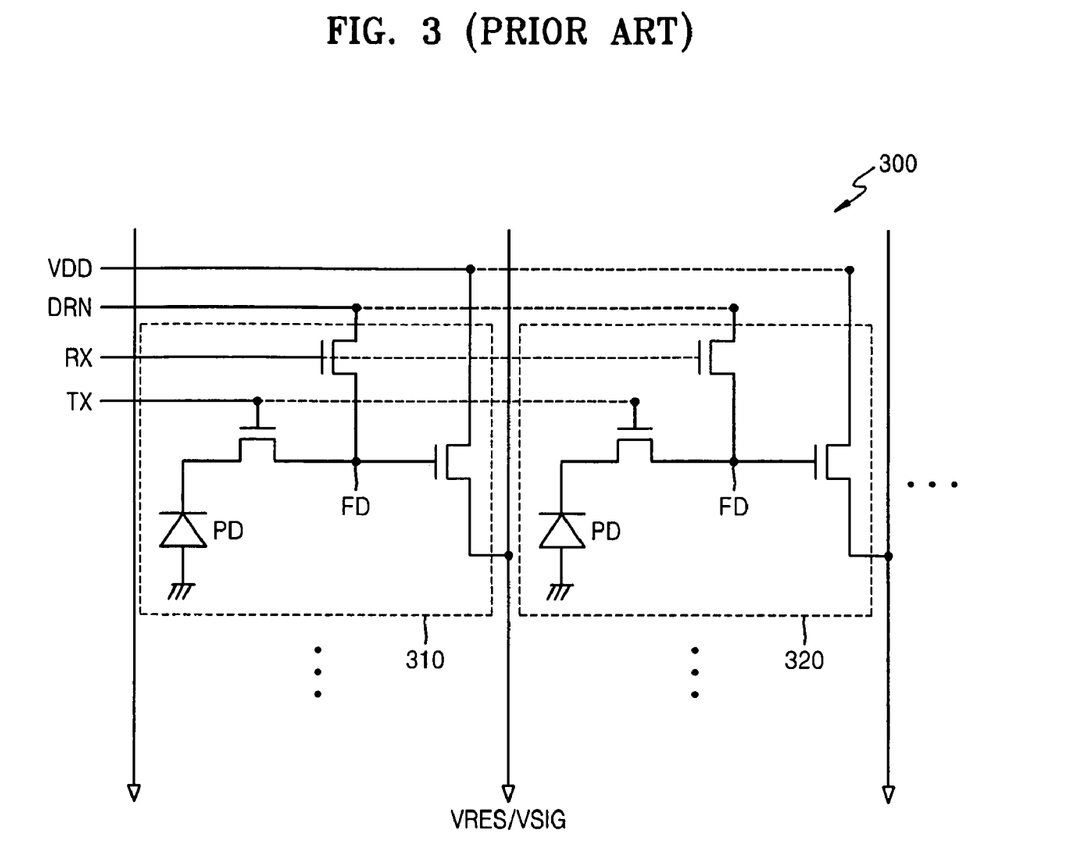
FIG. 3 is a circuit diagram of pixel driving circuits in the APS array of FIG. 1, according to the prior art.

FIG. 3 is a circuit diagram of a pixel driving circuit 300 of the APS array 110 of FIG. 1. Unit pixel circuits 310 and 320 are arranged two-dimensionally in the APS array 110, and each of the unit pixel circuits 310 and 320 includes a photodiode PD and three transistors. Although not shown in FIG. 3, unit pixel circuits including four transistors may be used. The unit pixel circuits 310 and 320 perform a rolling shutter mode operation, i.e., a continuous frame capture mode operation, using the CDS method.

For a selected pixel, a floating diffusion (FD) node signal is generated and output as a reset signal VRES from the signals RX, DRN, and VDD turning on a reset transistor and a source follower transistor. Additionally for the selected pixel, a signal detected by the photodiode PD is transmitted to the FD node when a transfer control signal TX becomes active, and an image signal VSIG incorporating such a detected signal is output by the source follower transistor.

The difference between the reset signal VRES and the image signal VSIG, which is an analog signal, is converted by the ADC 130 into a digital signal. The signals DRN, VDD, RX, and TX may be generated by the row driver 120. In this manner in FIG. 3, each of the unit pixel circuits 310 and 320 included in the CMOS image sensor 100 includes the photodiode PD and the transistors for outputting the reset signal VRES and the image signal VSIG using appropriate timing.

Recently, as the number of pixels that is included in an image sensor has increased, smaller size pixels are desired for enhancing display quality with higher pixel density. Thus, the size of photodiode PD and the transistors of the unit pixel circuits 310 and 320 and the metal wiring connecting the photodiode PD and the transistors are desired to be designed accordingly.

In particular, sufficient space is desired for the photodiode PD in each of the unit pixel circuits 310 and 320. To this end, the number of transistors in each of the unit pixel circuits 310 and 320 may be reduced. Also, attempts are being made to reduce the size of the transistors in each of the unit pixel circuits 310 and 320 using advanced fabrication technology for an enhanced fill factor of the photodiode PD. However, there is a limit to reducing the number of transistors in each of the unit pixel circuits 310 and 320, and advanced fabrication technology is expensive. These problems are exacerbated when an additional transistor is needed for removing overflow current from the photodiode PD for a global shutter mode operation, i.e., a signal frame capture mode operation.

To enhance external light reaching the photodiode PD, the widths of metal wiring in an upper layer of the photodiode PD may be reduced. Such metal wiring is a major obstruction in an optical path. However, there is a limit to reducing the widths of metal wiring while complying with design rules.

SUMMARY OF THE INVENTION

Thus, the present invention enhances the fill factor of photodiodes in an image sensor by reducing such metal wiring and the number of transistors in the pixel circuits.

According to a general aspect of the present invention, a pixel circuit of an image sensor includes a reset transistor and a source follower transistor. The reset transistor has a reset drain/source contact that is shared with a first neighboring pixel circuit. The source follower transistor has a source follower drain/source contact that is shared with a second neighboring pixel circuit. Furthermore, the pixel circuit includes an interconnect line coupled to the reset drain/source contact and the source follower drain/source contact. The common interconnect line is adapted to provide a common toggled control signal on such shared contacts.

In one embodiment of the present invention, the common toggled control signal is initially deactivated to logic low, and then is activated to logic high during a reset signal readout and an image signal readout from the pixel circuit.

In another embodiment of the present invention, the first neighboring pixel circuit and the second neighboring pixel circuit are disposed on opposite sides of the pixel circuit.

In a further aspect of the present invention, the pixel circuit also includes a photodiode and a transfer transistor. The photodiode converts incident light to an electrical signal. The transfer transistor is coupled to the photodiode for transmitting the electrical signal from the photodiode during an image signal readout from the pixel circuit.

In an example embodiment of the present invention, the first neighboring pixel circuit has a corresponding reset transistor coupled to the reset drain/source contact, and the second neighboring pixel circuit has a corresponding source follower transistor coupled to the source follower drain/source contact.

In a further embodiment of the present invention, the pixel circuit and the first neighboring pixel circuit are laid out symmetrically, and the pixel circuit and the second neighboring pixel circuit are laid out symmetrically.

In another general aspect of the present invention, a pixel driver in an image sensor includes a first pixel circuit, a second pixel circuit, and a common overflow device. The first pixel circuit drives a first photodiode, and the second pixel circuit drives a second photodiode. The common overflow device couples the first and second pixel circuits to a power supply node.

In an example embodiment of the present invention, the common overflow device is adapted to initially be turned off during a global shutter operation, and then turned on during an image signal readout and a reset signal readout from the first and second pixel circuits.

In a further embodiment of the present invention, the common overflow device is a field effect transistor.

In an additional embodiment of the present invention, the power supply node is a reset drain/source contact shared between the first and second pixel circuits.

In another aspect of the present invention, the reset drain/source contact has applied thereon a control signal that is toggled for a rolling shutter operation and that is set at a logic high state for a global shutter operation. The common overflow device is turned off during a rolling shutter operation.

In this manner, because the common interconnect line is used for shared contacts to both the reset transistor and the source follower transistor, metal wiring is minimized for enhanced fill factor of the photodiodes in the image sensor. Additionally, because the common overflow transistor is shared between neighboring pixels, the fill factor of the photodiodes is further enhanced.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, and 10 refer to elements having similar structure and/or function.

DETAILED DESCRIPTION OF THE INVENTION

Figure 4:
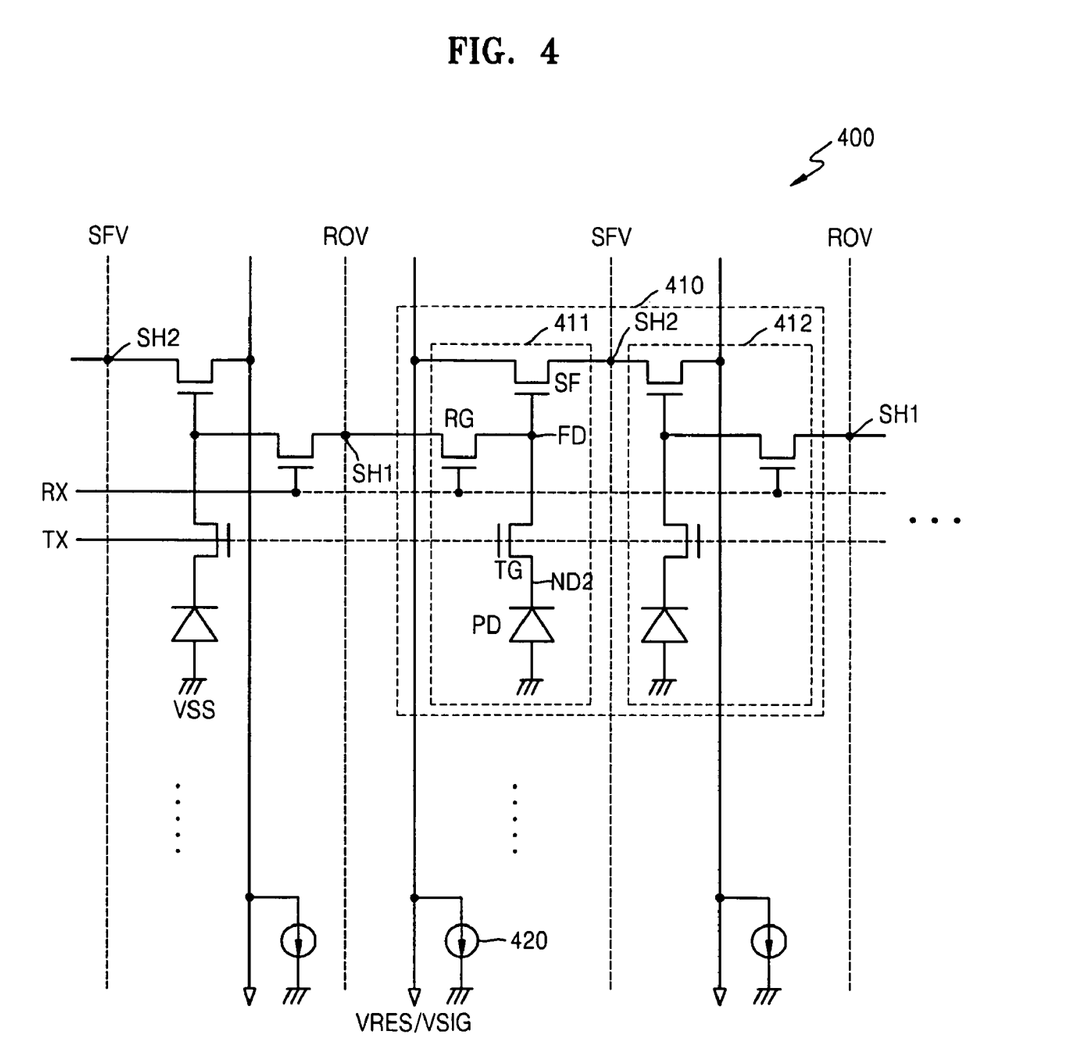
FIG. 4 is a circuit diagram of pixel driving circuits in a CMOS image sensor, according to an embodiment of the present invention.
Figure 5:
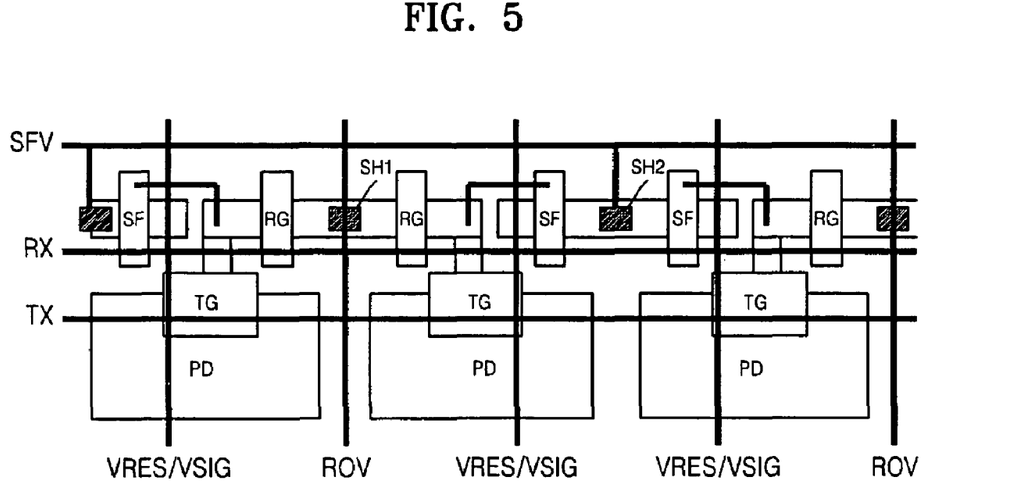
FIG. 5 is a plan view of a layout of the pixel driving circuits of FIG. 4, according to an embodiment of the present invention.

FIG. 4 is a circuit diagram of a pixel driver 400 included in a complementary metal oxide semiconductor (CMOS) image sensor, according to an embodiment of the present invention. FIG. 5 is a plan view illustrating the layout of the pixel driver 400 of FIG. 4, according to an embodiment of the present invention.

Referring to FIGS. 4 and 5, the pixel driver 400 includes a plurality of 2-pixel circuits 410, each including two unit pixel circuits 411 and 412. Each pixel circuit 411 includes a corresponding bias circuit 420 for biasing an output node of the pixel circuit 411. A plurality of 2-pixel circuits 410 are arranged top to bottom and left to right in a two-dimensional active pixel sensor (APS) array.

Referring to FIGS. 4 and 5, the unit pixel circuits 411 and 412 in each of the 2-pixel circuits 410 are laid out symmetrical to each other. According to an aspect of the present invention, each unit pixel circuit 411 or 412 receives first and second common control signals ROV and SFV from contacts SH1 and SH2 shared with neighboring pixels.

The bias circuit 420 is disposed vertically above or below the APS array, and may be coupled to an output node of a corresponding unit pixel circuit. The CMOS image sensor of FIG. 4 may include a row driver and an analog-to-digital converter (ADC) like the conventional CMOS image sensor of FIG. 1. In that case, the row driver (not shown) generates the common control signals ROV and SFV, a reset control signal RX, and a transfer control signal TX, illustrated in FIG. 4. Also in that case, the ADC (not shown) receives an analog reset signal VRES and an image signal VSIG from an output node of the CMOS image sensor, and converts the analog reset signal VRES and the image signal VSIG into digital signals.

Each unit pixel circuit 411 in the APS array includes a reset transistor RG, a source follower transistor SF, a transfer transistor TG, and a photodiode PD. All of the transistors of FIG. 4 are n-type MOS field effect transistors (NMOSFETs), but may be formed with other types of transistors. The unit pixel circuit 412 symmetrical to the unit pixel circuit 411 includes similar such transistors laid out symmetrically with those of the unit pixel circuit 411.

Referring to FIGS. 4 and 5, the reset transistor RG of each unit pixel circuit has a reset drain/source contact SH1 that is shared with a neighboring unit pixel circuit. The shared reset drain/source contact SH1 is formed onto each drain/source junction of the reset transistors RG of such neighboring unit pixel circuits in one embodiment of the present invention. A first control signal ROV is applied on such a shared reset drain/source contact SH1.

In addition, the source follower transistor SF of each unit pixel circuit has a source follower drain/source contact SH2 that is shared with a neighboring unit pixel circuit. The shared source follower drain/source contact SH2 is formed onto each drain/source junction of the source follower transistors SF of such neighboring unit pixel circuits in one embodiment of the present invention. A second control signal SFV is applied on such a shared source follower drain/source contact SH2.

The reset control signal RX is applied to a gate electrode of the reset transistor RG. Another drain/source electrode of the reset transistor RG not having the control signal ROV applied thereon is coupled to a floating diffusion (FD) node.

The FD node is coupled to a gate electrode of the source follower transistor SF. Another drain/source electrode of the source follower transistor SF not having the control signal SFV applied thereon is coupled to the output node for the unit pixel circuit.

The transfer control signal TX is applied to a gate electrode of the transfer transistor TG. The transfer transistor TG has a first source/drain coupled to the FD node and a second source/drain coupled to the photodiode PD. The photodiode PD is coupled between a power source VSS (for example, a ground voltage source) and the transfer transistor TG.

Figure 6:
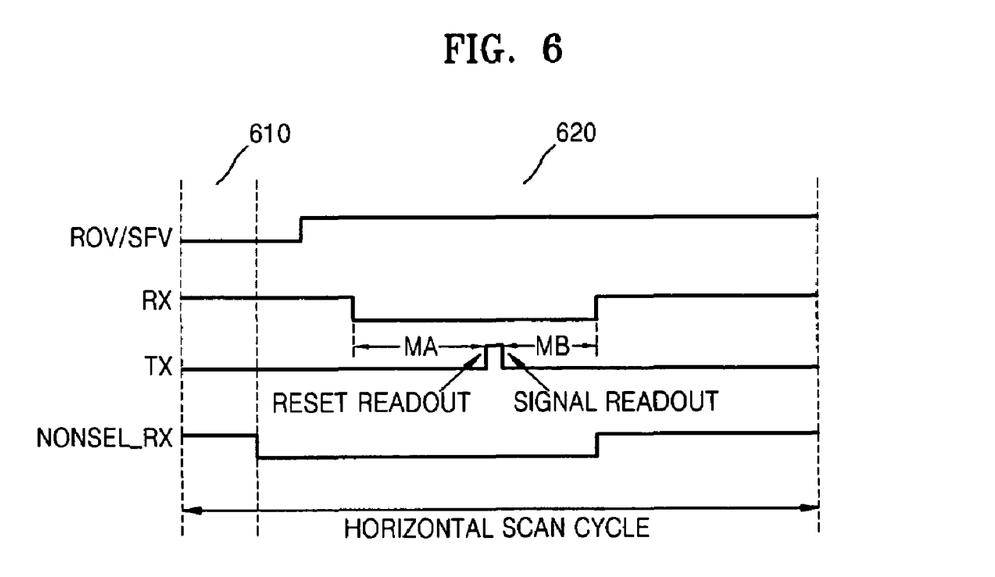
FIG. 6 is a timing diagram of signals driving a pixel driving circuit of FIG. 4 during a horizontal scan cycle, according to an embodiment of the present invention.
Figure 10:
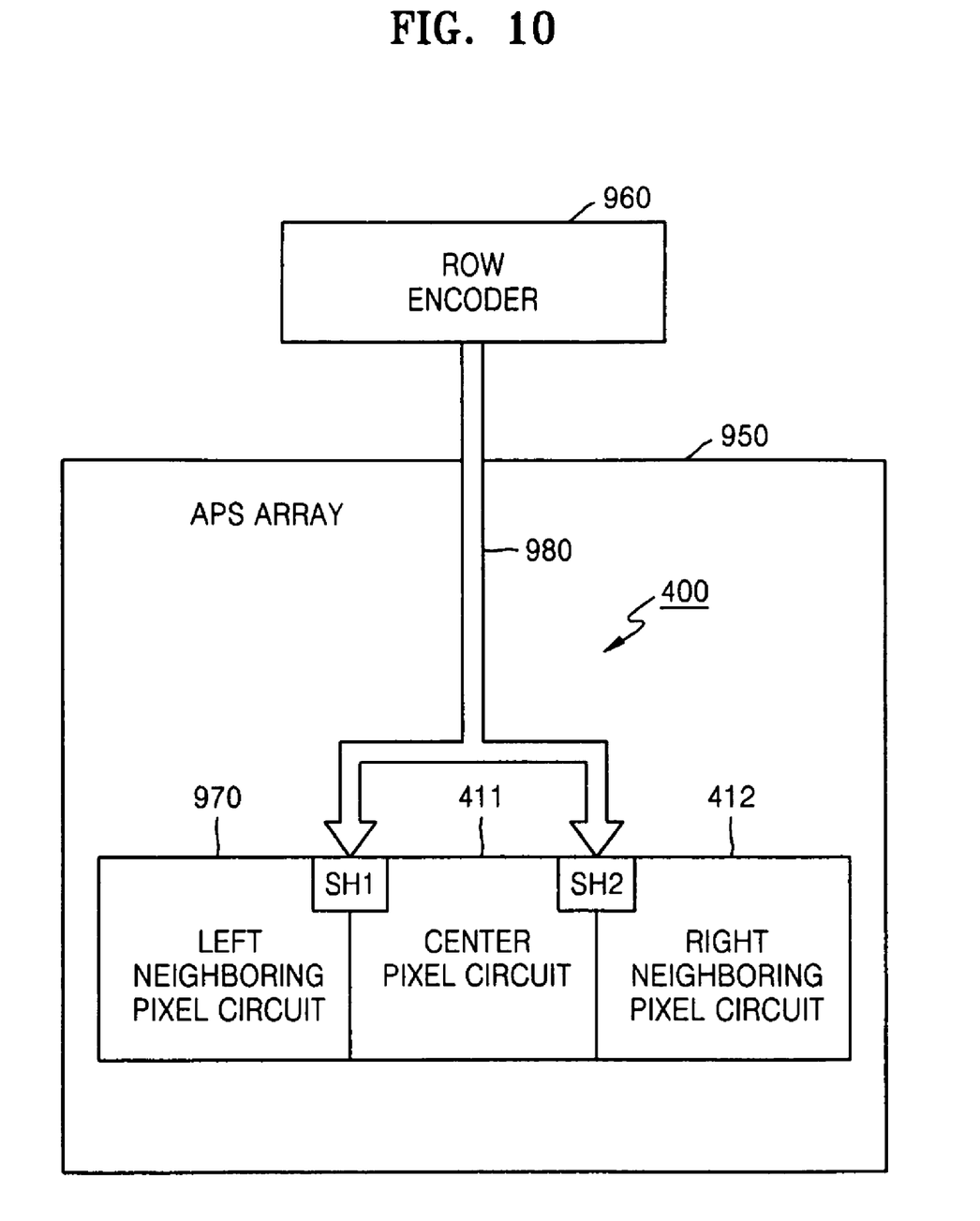
FIG. 10 illustrates a common interconnect line providing a common control signal to the pixel driving circuits of FIG. 4, according to an embodiment of the present invention.

Referring to FIGS. 4, 5, and 10, with such shared contacts SH1 and SH2, metal wiring is minimized, especially when the control signals ROV and SFV are common control signals as illustrated in FIG. 6.

FIG. 10 shows the pixel driver 400 within an APS array 950 and a row decoder 960 for generating the common ROV and SFV signal. The center unit pixel circuit 411 shares the reset drain/source contact SH1 with a left neighboring unit pixel circuit 970, and shares the source follower drain/source contact SH2 with the right neighboring unit pixel circuit 412. In one embodiment of the present invention, the left and right neighboring unit pixel circuits 970 and 412 are disposed on opposite sides of the center pixel circuit 411 in a lay-out of the pixel driver 400. The present invention may be practiced when the center pixel circuit 411 shares contacts with neighboring pixel circuits on any sides of the center pixel circuit 411.

In one aspect of the present invention, the control signals ROV and SFV are common control signals (i.e., are substantially same) such that one interconnect line 980 couples such a common control signal from the row decoder 960 to the contacts SH1 and SH2. Near the contacts SH1 and SH2, the interconnect line 980 branches to such contacts SH1 and SH2. However, just one interconnect line 980 runs over a substantially portion of the APS array 950 to minimize wiring above the photodiodes of the APA array 950. Such minimized wiring enhances the fill factor of such photodiodes.

In contrast in the prior art, four metal wires are used for biasing the source/drain electrodes of the reset transistors and the source follower transistors of every two unit pixel circuits.

FIG. 6 is a timing diagram of signals driving the pixel driver 400 of FIG. 4 during a horizontal scan cycle, according to an embodiment of the present invention. Referring to FIG. 6, the CMOS image sensor performs a rolling shutter operation in response to the reset control signal RX and the transfer control signal TX. In the rolling shutter operation, signals photo-electrically converted by photodiodes in a frame are transferred row by row from the photodiodes to the FD node, and an image signal is output as a result.

Referring to FIGS. 4 and 6, the control signals ROV and SFV are supplied to all pixels, and are substantially the same in one embodiment of the present invention. In addition, the control signals ROV and SFV are toggled between logic low and logic high. Thus, the control signals ROV and SFV comprise a common toggled control signal. Referring to FIG. 10, the common toggled control signal ROV/SFV is applied onto one interconnect line 980.

Referring to FIG. 6, the common control signal ROV/SFV is at logic low in a first section 610 and is activated to logic high in a second section 620. Another reset control signal NONSEL_RX for inactivated pixels in the non-selected rows is set to logic low for a longer time period than the reset control RX for the activated pixels in a selected row having image data to be read out.

The reset control signal RX is activated at logic low while the common control signal ROV/SFV is activated at logic high. The transfer control signal TX is activated at logic high for a period of time during which the reset control signal RX is logic low with margins MA and MB. The margin MA is from time A when the reset control signal RX is activated at logic low to the time when the transfer control signal TX is activated to logic high. The margin MB is from the time B when the transfer control signal TX is deactivated to logic low to when the reset control signal RX is deactivated at logic high.

For example, assume that the unit pixel circuit 411 of FIG. 4 is activated (or selected) for image data read-out. In that case, during the first section 610 in FIG. 6, the reset control signal RX is logic high. The common control signal ROV/SFV is transmitted through the reset transistor RG to the FD node, and the source follower transistor SF is turned off.

In the second section 620 in FIG. 6, the common control signal ROV/SFV toggles to logic high before the reset control signal RX is activated at logic low. Accordingly, the voltage of the FD node is reset to a level of logic high of the ROV/SFV signal.

In addition, the source follower transistor SF is turned on to transmit the voltage of the FD node. Such a voltage at the FD node is proportional to the control signal ROV/SFV and forms the reset signal VRES output by the unit pixel circuit 411.

Thereafter, the transfer transistor TG is turned on when the transfer control signal TX is activated to logic high to transfer the charge signal from the photodiode PD to the FD node. When the transfer control signal TX switches back to logic low, the source follower transistor SF in the unit pixel circuit 411 outputs the image signal VSIG.

Each pixel circuit in a selected row is sequentially activated to output the corresponding reset and image signals VRES and VSIG. An analog-to-digital converter (ADC, not shown) may use a correlated double sampling (CDS) method to process such signals VRES and VSIG. For example, the ADC may convert an analog signal corresponding to a difference between such signals VRES and VSIG into a digital signal that is then output to a digital signal processing unit that further interpolates the digital signal. The digital signal processing unit from such interpolated digital signals then generates driving signals appropriate for the resolution of a display device such as a LCD (liquid crystal display).

In this manner, because the common interconnect line 980 is used for shared contacts SH1 and SH2 to both the reset transistor and the source follower transistor, metal wiring is minimized for enhanced fill factor of the photodiodes in the image sensor. In addition, the contacts SH1 and SH2 are shared between neighboring pixels for further enhanced fill factor of the photodiodes in the image sensor. Furthermore, the toggled controls signals ROV and SFV are applied on the reset transistor RG and the source follower transistor SF for potentially conserving power during operation of the pixel circuits.

Figure 7:
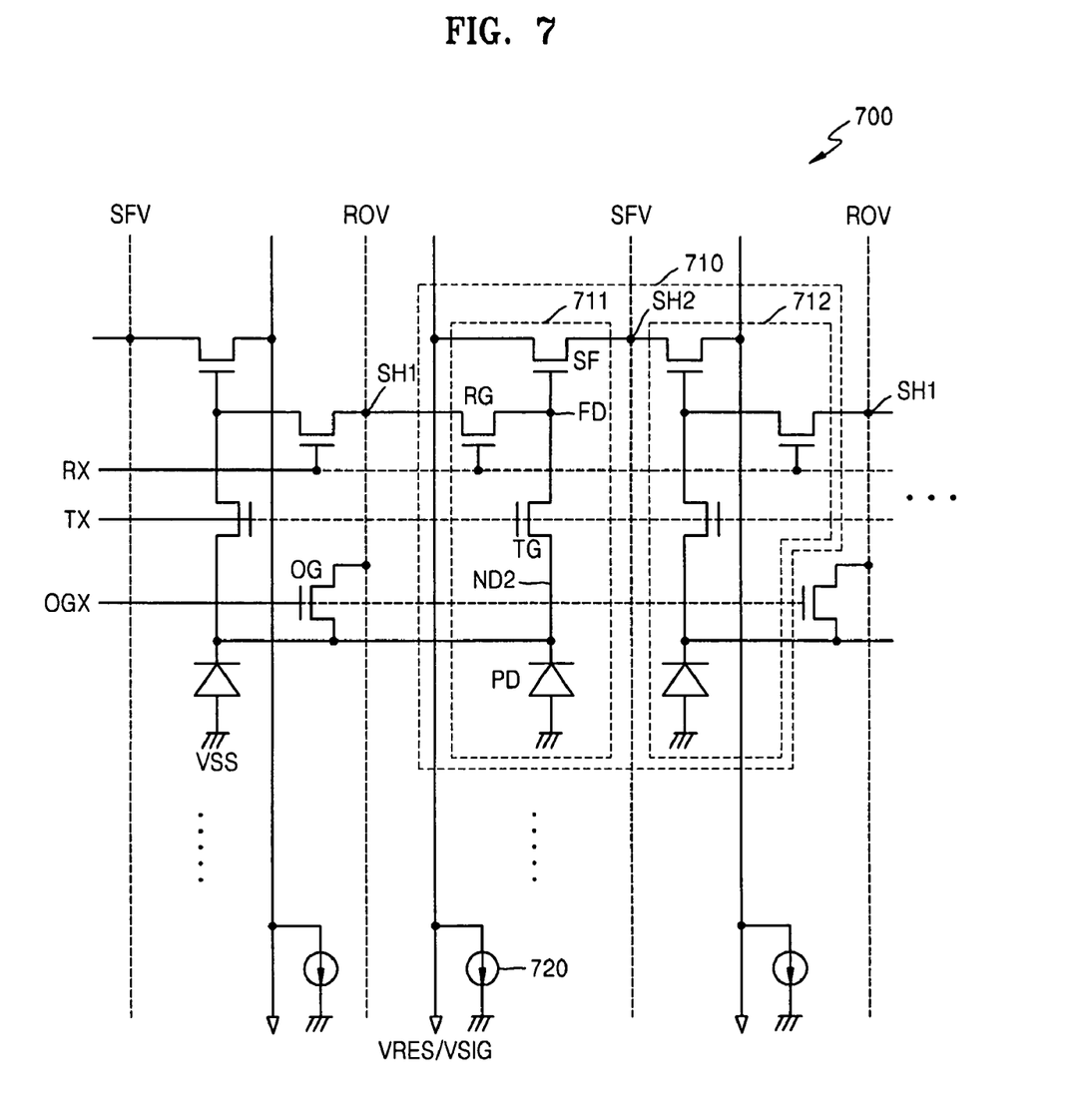
FIG. 7 is a circuit diagram of a pixel driver included in a CMOS image sensor, according to another embodiment of the present invention.

FIG. 7 is a circuit diagram of a pixel driver 700 included in a CMOS image sensor, according to another embodiment of the present invention. Referring to FIG. 7, the pixel driver 700 includes a plurality of 2-pixel circuits 710, each composed of two unit pixel circuits 711 and 712. Each unit pixel circuit 711 has a bias circuit 720 for biasing an output node of the unit pixel circuit 711. The plurality of 2-pixel circuits 710 are arranged top to bottom and left to right in a two-dimensional active pixel sensor (APS) array. Each of the unit pixel circuits includes reset, source follower, and transfer transistors for performing similar operations to those of FIG. 4.

In the embodiment FIG. 7, the pixel driver 700 further includes an overflow gate transistor OG shared by two pixels. The present invention may be implemented with any transistor-type device for the overflow gate transistor OG aside from the MOSFET (metal oxide semiconductor field effect transistor) OG shown in FIG. 7.

For efficient metal wiring similar to FIG. 4, the unit pixel circuits 711 and 712 that are laid out symmetrically receive the control signals ROV and SFV via contacts SH1 and SH2 that are shared with neighboring pixels. In addition, one overflow gate transistor OG for the global shutter operation is shared by every two pixels. In the global shutter operation, all signals photo-electrically converted by photodiodes in a frame are supplied at a time from the photodiodes to the FD nodes, and an image signal is output as a result.

Referring to FIG. 7, an overflow control signal OGX is applied to a gate electrode of the overflow gate transistor OG. A first source/drain electrode of the overflow gate transistor OG is coupled to the photodiodes PD of the 2-pixel circuits sharing the overflow gate transistor OG. A second source/drain electrode of the overflow gate transistor OG is coupled to the contact SH1 shared by such 2-pixel circuits for receiving the control signal ROV.

Figure 8:
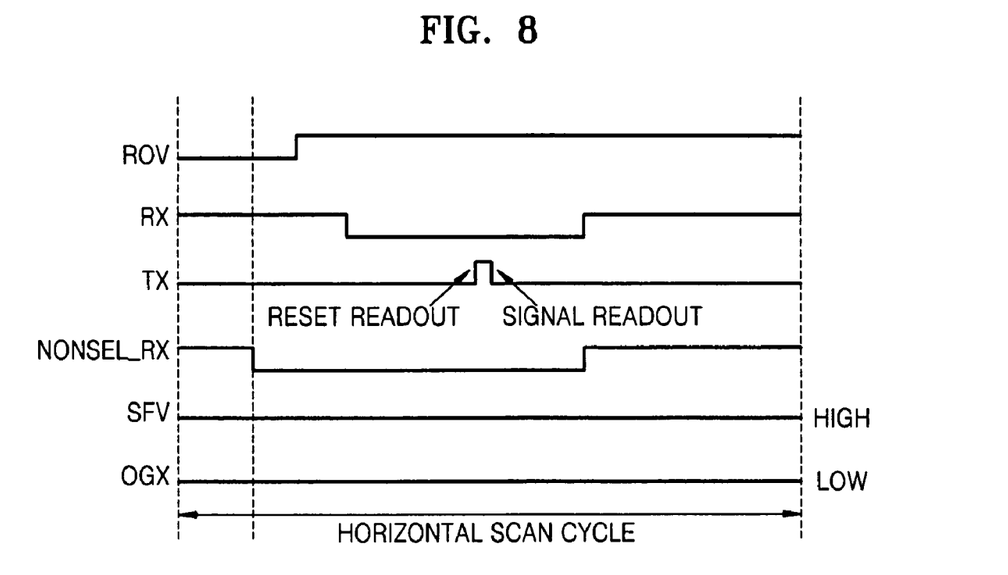
FIG. 8 is a timing diagram of signals when the pixel driver of FIG. 7 performs a rolling shutter operation, according to an embodiment of the present invention.

FIG. 8 is a timing diagram of signals when the pixel driver 700 of FIG. 7 performs the rolling shutter operation, in one example embodiment of the present invention. The timing diagram of FIG. 8 is similar to that of FIG. 6 except that the SFV signal applied to the source follower transistors SF is set to a logic high at all times in the example embodiment of FIG. 8.

Additionally in the rolling shutter operation of FIG. 8, the overflow control signal OGX is always set to logic low such that the overflow gate transistor OG is turned off. Apart from such features, the rolling shutter operation of the pixel driver 700 of FIG. 7 is similar to that of the pixel driver 400 of FIG. 4 described with reference to FIG. 6.

Figure 9:
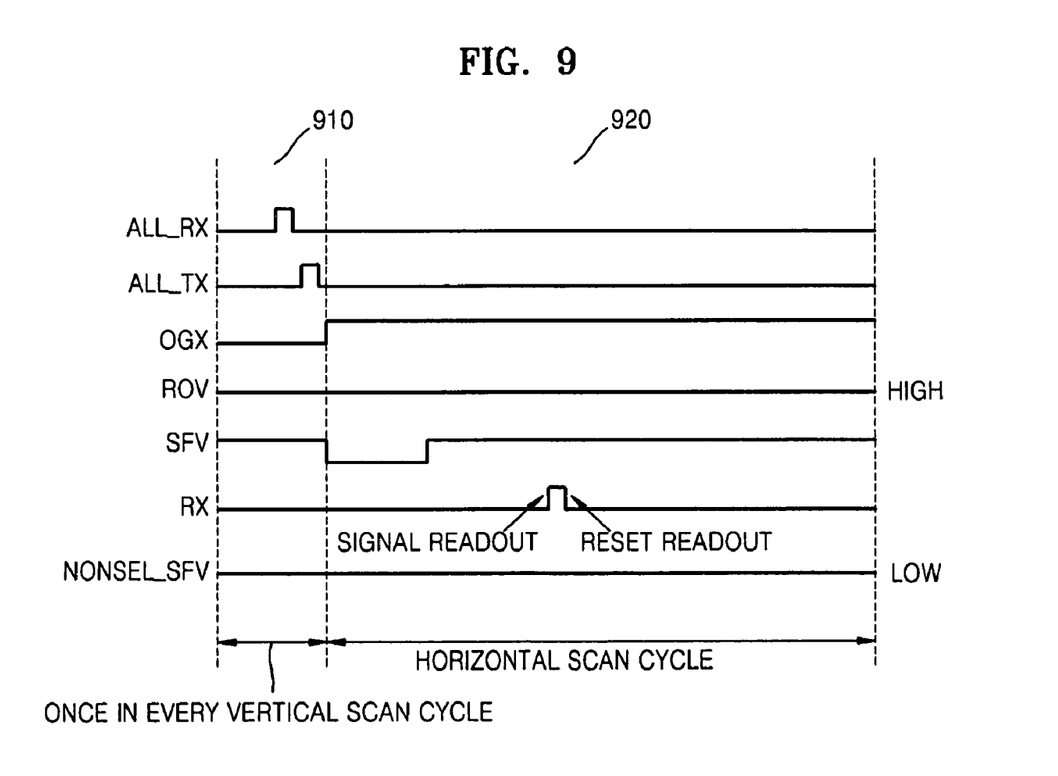
FIG. 9 is a timing diagram of signals when the pixel driver of FIG. 7 performs a global shutter operation, according to an embodiment of the present invention.

FIG. 9 is a timing diagram of signals when the pixel driver 700 of FIG. 7 performs the global shutter operation. Referring to FIG. 9, in the global shutter operation represented by a first section 910, a reset control signal ALL_RX of all pixels is activated at logic high once in every vertical scan cycle while the control signal SFV is logic high. In that case, the reset transistors RG of all pixels are turned on. Accordingly, the voltage at each FD node of all pixels is reset to a level of the control signal ROV.

Thereafter during the first section 910 in FIG. 9, the reset control signal ALL_RX turns logic low and a transfer control signal ALL_TX turns logic high. In that case, the photo-electrically converted signal from each of the photodiodes PD of all pixels in a frame is transmitted to the respective FD node.

During a second section 920 in the timing diagram of FIG. 9, the pixels in each row sequentially output the reset signal VRES and the image signal VSIG. During that time, the overflow control signal OGX is activated at logic high, and the overflow gate transistor OG turns on to couple the photodiode to the control signal ROV that is set at logic high (i.e., a VDD power supply level for example), before the reset signal VRES and the image signal VSIG are output. In that case, the photodiode PD becomes coupled to a power supply node when the overflow gate transistor OG turns on.

Such coupling via the overflow gate transistor OG prevents electrons generated by the photodiode PD after receiving light from overflowing to the FD node. While the photodiode PD is thus reset by the overflow gate transistor OG, the control signal SFV is set to logic low. As illustrated in FIG. 9, the control signal ROV is always logic high, and a control signal NONSEL_SFV (i.e., the SFV signal for inactivated rows) is always set at logic low.

Further referring to FIG. 9, after the output of the photodiode PD is reset by the overflow gate transistor OG, the control signal SFV switches to logic high. Accordingly, the source follower transistor SF operates in response to a photo-electrically converted signal transmitted from the photodiode PD to the FD node and outputs current corresponding to the photo-electrically converted signal. In this manner, the image signal VSIG is output through the source terminal of the source follower transistor SF.

After the image signal VSIG is read out, the reset control signal RX turns logic high for a period of time such that the control signal ROV is transmitted to the FD node. When the reset control signal RX switches back to logic low, the source follower transistor SF outputs current corresponding to the level of the control signal ROV at the FD node as the reset signal VRES.

The pixel circuits in each row of the APS array of FIG. 7 are sequentially activated such that each pixel circuit outputs a respective set of reset and image signals VRES and VSIG. In the global shutter operation, the image signal VSIG is output first and, after a pulse of the reset control signal RX is activated, the reset signal VRES is output.

In this manner, because the common overflow device OG is shared between neighboring pixels, the fill factor of the photodiodes is further enhanced during global shutter operation of the image sensor.

The foregoing is by way of example only and is not intended to be limiting. For example, any type of transistor devices may be used in the pixel circuits. In addition, the signals shown in the timing diagram are by way of example only for describing example operations.

The present invention is limited only as defined in the following claims and equivalents thereof.

What is claimed is:

1. A pixel circuit of an image sensor, the pixel circuit comprising:
   a reset transistor having a reset drain/source contact that is shared with a first neighboring pixel circuit;
   wherein the reset drain/source contact is formed onto one first shared drain/source junction formed in a substrate for both of said pixel circuit and said first neighboring pixel circuit, and wherein the reset drain/source contact has a first ohmic contact area making contact with the first shared drain/source junction;
   and wherein said pixel circuit and said first neighboring pixel circuit have two respective reset transistors;
   a source follower transistor having a source follower drain/source contact that is shared with a second neighboring pixel circuit;

wherein the source follower drain/source contact is formed onto one second shared drain/source junction formed in the substrate for both of said pixel circuit and said second neighboring pixel circuit, and wherein the source follower drain/source contact has a second ohmic contact area making contact with the second shared drain/source junction, and wherein the first ohmic contact area is separate from the second ohmic contact area;

and wherein the first shared drain/source junction of the reset transistor is separated by a portion of the substrate from the second shared drain/source junction of the source follower transistor for said pixel circuit; and an interconnect line coupled to the reset drain/source contact and the source follower drain/source contact, and adapted to provide a common toggled control signal there-on.

2. The pixel circuit of claim 1, wherein the common toggled control signal is initially deactivated to logic low, and then is activated to logic high during a reset signal readout and an image signal readout from the pixel circuit.

3. The pixel circuit of claim 1, wherein the first neighboring pixel circuit and the second neighboring pixel circuit are disposed on opposite sides of the pixel circuit.

4. The pixel circuit of claim 1, further comprising:
a photodiode for converting incident light to an electrical signal; and
a transfer transistor coupled to the photodiode for transmitting the electrical signal from the photodiode during an image signal readout from the pixel circuit.

5. The pixel circuit of claim 1, wherein the first neighboring pixel circuit has a corresponding reset transistor coupled to the reset drain/source contact, and wherein the second neighboring pixel circuit has a corresponding source follower transistor coupled to the source follower drain/source contact.

6. The pixel circuit of claim 1, wherein the pixel circuit and the first neighboring pixel circuit are laid out symmetrically.

7. The pixel circuit of claim 6, wherein the pixel circuit and the second neighboring pixel circuit are laid out symmetrically.

8. The pixel circuit of claim 1, wherein the two reset transistors have separate respective reset gates formed to abut said one first shared drain/source junction.

9. The pixel circuit of claim 1, wherein the source follower drain/source contact is formed onto said one second shared drain/source junction formed for both of said pixel circuit and said second neighboring pixel circuit.

10. A method of driving a pixel circuit in an image sensor, comprising:
supplying a common toggled control signal to a reset drain/source contact shared between the pixel circuit and a first neighboring pixel circuit;
wherein the reset drain/source contact is formed onto one shared drain/source junction formed in a substrate for both of said pixel circuit and said first neighboring pixel circuit, and wherein the reset drain/source contact has a first ohmic contact area making contact with the first shared drain/source junction;

and wherein said pixel circuit and said first neighboring pixel circuit have two respective reset transistors;
supplying the common toggled control signal to a source follower drain/source contact shared between the pixel circuit and a second neighboring pixel circuit;
wherein the source follower drain/source contact is formed onto one second shared drain/source junction formed in the substrate for both of said pixel circuit and said second neighboring pixel circuit, and wherein the source follower drain/source contact has a second ohmic contact area making contact with the second shared drain/source junction, and wherein the first ohmic contact area is separate from the second ohmic contact area;

and wherein the first shared drain/source junction of the reset transistor is separated by a portion of the substrate from the second shared drain/source junction of the source follower transistor for said pixel circuit; and generating the common toggled control signal onto an interconnect line coupled to the reset drain/source contact and the source follower drain/source contact.

11. The method of claim 10, further comprising:
initially deactivating the common toggled control signal to logic low; and
activating the common toggled control signal to logic high during a reset signal readout and an image signal readout from the pixel circuit.

12. The method of claim 10, further comprising:
forming the reset drain/source contact to be coupled to reset transistors of the pixel circuit and the first neighboring pixel circuit; and
forming the source follower drain/source contact to be coupled to source follower transistors of the pixel circuit and the second neighboring pixel circuit.

13. The method of claim 10, further comprising:
forming the first neighboring pixel circuit and the second neighboring pixel circuit to be disposed on opposite sides of the pixel circuit.

14. The method of claim 10, further comprising:
converting incident light to an electrical signal at a photodiode of the pixel circuit; and
transmitting the electrical signal from the photodiode during an image signal readout from the pixel circuit.

15. The method of claim 10, further comprising:
laying out the pixel circuit and the first neighboring pixel circuit to be symmetrical.

16. The method of claim 15, further comprising:
laying out the pixel circuit and the second neighboring pixel circuit to be symmetrical.

17. The method of claim 10, wherein the two reset transistors have separate respective reset gates formed to abut said one first shared drain/source junction.

18. The method of claim 10, wherein the source follower drain/source contact is formed onto said one second shared drain/source junction formed for both of said pixel circuit and said second neighboring pixel circuit.

* * * * *